United States Patent
Wang et al.

(10) Patent No.: US 9,065,348 B2
(45) Date of Patent: *Jun. 23, 2015

(54) ISOLATED SWITCHING MODE POWER SUPPLY AND THE METHOD THEREOF

(71) Applicant: Chengdu Monolithic Power Systems Co., Ltd., Chengdu (CN)

(72) Inventors: Siran Wang, Hangzhou (CN); Junming Zhang, Hangzhou (CN); Yuancheng Ren, Hangzhou (CN)

(73) Assignee: Chengdu Monolithic Power Systems Co., Ltd., Chengdu (CN)

( * ) Notice: Subject to any disclaimer, the term of this patent is extended or adjusted under 35 U.S.C. 154(b) by 228 days.

This patent is subject to a terminal disclaimer.

(21) Appl. No.: 13/889,223

(22) Filed: May 7, 2013

(65) Prior Publication Data

US 2013/0300384 A1 Nov. 14, 2013

(30) Foreign Application Priority Data

May 8, 2012 (CN) .......................... 2012 1 0139228

(51) Int. Cl.
*H02M 3/335* (2006.01)
*H02M 1/36* (2007.01)

(52) U.S. Cl.
CPC ............ *H02M 3/33523* (2013.01); *H02M 1/36* (2013.01)

(58) Field of Classification Search
CPC H02M 1/36; H02M 3/33507; H02M 3/33523
See application file for complete search history.

(56) References Cited

U.S. PATENT DOCUMENTS

| 5,453,921 A * | 9/1995 | Shutts ........................ 363/21.18 |
| 6,456,511 B1 * | 9/2002 | Wong ......................... 363/21.13 |
| 8,625,309 B2 * | 1/2014 | Kawamura ................. 363/21.01 |
| 2011/0002068 A1 * | 1/2011 | Hu et al. ........................ 361/18 |
| 2011/0075450 A1 * | 3/2011 | Shimada .................... 363/21.18 |
| 2011/0267846 A1 * | 11/2011 | Djenguerian et al. ..... 363/21.12 |
| 2013/0077353 A1 | 3/2013 | Kuang |
| 2013/0141947 A1 * | 6/2013 | Sakurai et al. ............. 363/21.16 |
| 2013/0301310 A1 * | 11/2013 | Wang et al. ................ 363/21.12 |

* cited by examiner

*Primary Examiner* — Fred E Finch, III
(74) *Attorney, Agent, or Firm* — Perkins Coie LLP

(57) ABSTRACT

An isolated switching mode power supply, having: a transformer having a primary winding, a secondary winding and a third winding; a current limit comparator configured to provide a current limit signal based on the current sense signal and the peak current signal; a logic circuit configured to provide a logic control signal based on the frequency control signal and the current limit signal; a startup control circuit configured to generate a startup control signal based on the current sense signal; a load detecting circuit configured to provide a load detecting signal based on the second feedback signal and the switching signal; and a selector configured to provide the logic control signal or the startup control signal based on the load detecting signal.

10 Claims, 4 Drawing Sheets

US 9,065,348 B2

ISOLATED SWITCHING MODE POWER SUPPLY AND THE METHOD THEREOF

CROSS-REFERENCE TO RELATED APPLICATION(S)

This application claims priority to and the benefit of Chinese Patent Application No. 201210139228.X, filed May 8, 2012, which is incorporated herein by reference in its entirety.

TECHNICAL FIELD

The present invention relates generally to switching mode power supplies, and more particularly but not exclusively to isolated switching mode power supplies and the method thereof.

BACKGROUND

Primary control circuit combined with secondary control circuit are widely applied in isolated switching mode power supplies. The control signals of the secondary control circuit is transmitted by a coupler to the primary control circuit to control the operation of the isolated switching mode power supply with the control signals of the primary control circuit. Generally, the secondary control circuit is powered by the output voltage of the isolated switching mode power supply.

In some conditions, for example, during the startup of the isolated switching mode power supply, or when the isolated switching mode power supply is shorted, the output voltage is not high enough to power the secondary control circuit. In that case, the control signal generated by the secondary control circuit may be wrong. As a result, the isolated switching mode power supply may work improperly.

The present invention pertains to provide an isolated switching mode power supply with high efficiency and the method thereof.

SUMMARY

It is an object of the present invention to provide an isolated switching mode power supply and the method thereof to solve the above problems.

In accomplishing the above and other objects, there has been provided, in accordance with an embodiment of the present invention, an isolated power supply comprising: An isolated switching mode power supply, comprising: a transformer having a primary winding, a secondary winding and a third winding, the primary winding being configured to receive an input signal, the secondary winding being configured to provide an output voltage, the third winding being configured to generate a second feedback signal indicative of the output voltage; a primary power switch coupled between the primary winding and a primary ground node, the primary power switch having a control terminal configured to receive a switching signal; a current limit comparator having a first input terminal configured to receive a current sense signal indicative of a current flowing through the primary winding, a second input terminal configured to receive a peak current signal, and an output terminal configured to provide a current limit signal based on the current sense signal and the peak current signal; a logic circuit having a first input terminal configured to receive a frequency control signal indicative of the output voltage, a second input terminal coupled to the output terminal of the current limit comparator to receive the current limit signal, and an output terminal configured to provide a logic control signal based on the frequency control signal and the current limit signal; a startup control circuit having an input terminal configured to receive the current sense signal and an output terminal configured to generate a startup control signal based on the current sense signal; a load detecting circuit having a first input terminal coupled to the third winding to receive the second feedback signal, a second input terminal configured to receive the switching signal, a third input terminal configured to receive a second reference signal, and an output signal configured to provide a load detecting signal based on the second feedback signal, the second reference signal and the switching signal; and a selector having a first input terminal coupled to the output terminal of the startup control circuit to receive the startup control signal, a second input terminal coupled to the output terminal of the logic circuit to receive the logic control signal, a control terminal coupled to the output terminal of the load detecting circuit to receive the load detecting signal, and an output terminal configured to provide the logic control signal or the startup control signal based on the load detecting signal.

Furthermore, there has been provided, in accordance with an embodiment of the present invention, A method of controlling an isolated switching mode power supply, wherein the isolated switching mode power supply comprises a transformer, a primary power switch and a secondary power switch, wherein the transformer has a primary winding, a secondary winding and a third winding, and wherein the primary power switch is coupled to the primary winding and the secondary power switch is coupled to the secondary winding, the method comprising: generating a logical control signal based on a current sense signal indicative of a current flowing through the primary winding and a frequency control signal indicative of the output voltage of the switching mode power supply; generating a startup control signal based on the current sense signal; generating a load detecting signal based on the voltage across the third winding, wherein the voltage across the third winding indicates the output voltage of the switching mode power supply; selecting the logic control signal or the startup control signal as a switching signal based on the load detecting signal; and turning ON and OFF the primary power switch based on the switching signal.

The presented isolated switching mode power supply and the method thereof reduce the power consumption so that to improve the efficiency.

BRIEF DESCRIPTION OF THE DRAWINGS

FIG. 3 schematically shows a class D audio amplifier with a noise suppression circuit in accordance with an embodiment of the present invention.

The use of the same reference label in different drawings indicates same or like components.

DETAILED DESCRIPTION

In the present invention, numerous specific details are provided, such as examples of circuits, components, and methods, to provide a thorough understanding of embodiments of the invention. Persons of ordinary skill in the art will recognize, however, that the invention can be practiced without one or more of the specific details, and could be adopted in many applications besides the phase-shift dimming circuits, for example, the invention could also be applied in interleaving circuits. In other instances, well-known details are not shown or described to avoid obscuring aspects of the invention.

Figure 2:
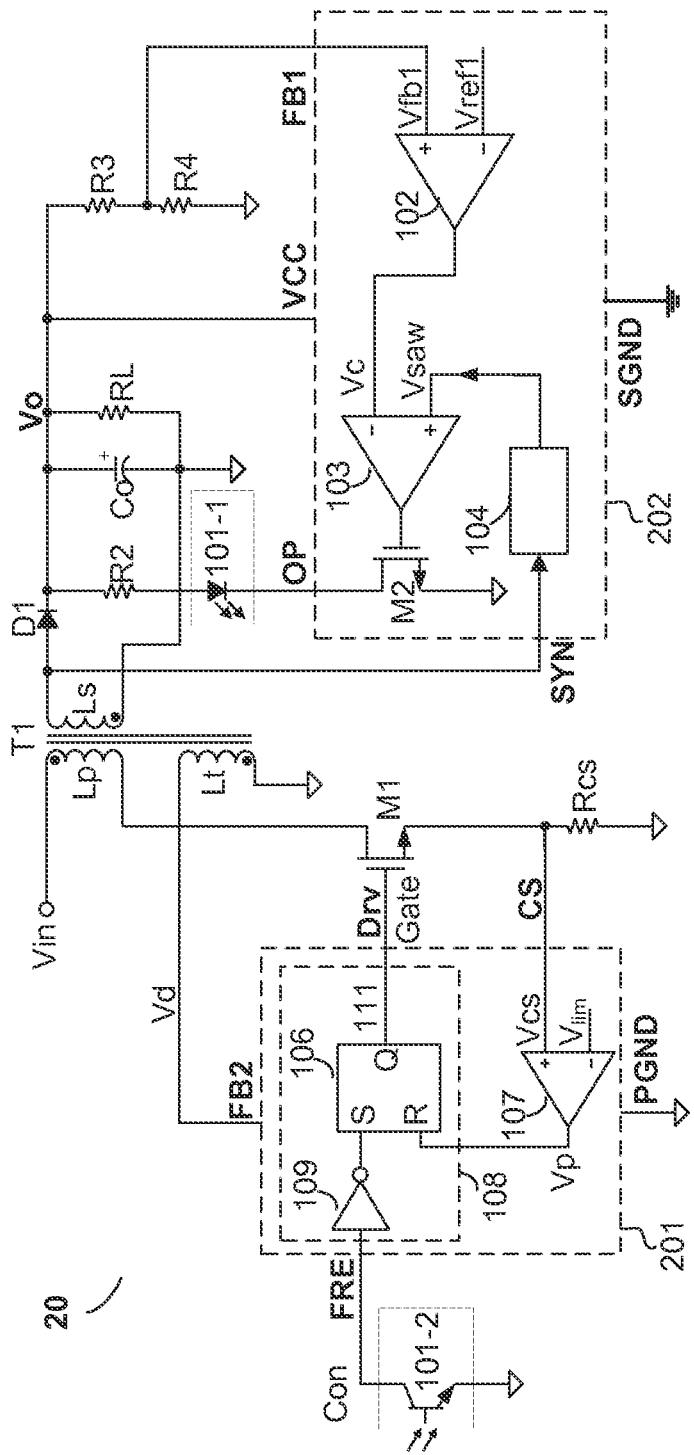
FIG. 2 schematically shows an isolated switching mode power supply 20 in accordance with an embodiment of the present invention.

FIG. 2 schematically shows an isolated switching mode power supply 20 in accordance with an embodiment of the present invention. The isolated switching mode power supply 20 comprises: an input terminal configured to receive an input voltage Vin; an output terminal configured to provide an output voltage Vo; a transformer T1 having a primary winding Lp, a secondary winding Ls and a third winding Lt respectively having a first terminal and a second terminal, the first terminal of the primary winding Lp being coupled to the input terminal to receive the input voltage Vin; a primary power switch M1 having a first terminal coupled to the second terminal of the primary winding Lp, a second terminal coupled to a primary ground node PGND and a control terminal; a secondary power switch D1 coupled between the first terminal of the secondary winding Ls and the output terminal of the isolated switching mode power supply 20; a secondary controller 202 having a power terminal Vcc configured to receive the output voltage Vo, a first feedback terminal FB1 configured to receive a first feedback signal Vfb1 indicative of the output voltage Vo, and a coupling control terminal OP configured to generate a frequency modulation signal based on the output voltage Vo and the first feedback signal Vfb1; a coupled device having an input side 101-1 coupled between the output terminal of the isolated switching mode power supply 20 and the coupling control terminal OP to receive the output voltage Vo and the frequency modulation signal, and an output side 101-2 configured to provide a frequency control signal Con based on the output voltage Vo and the frequency modulation signal; and a primary controller 201 having a current sense terminal CS configured to receive a current sense signal Vcs indicative of a current flowing through the primary winding Lp, a frequency control terminal FRE coupled to the output side 101-2 of the coupled device to receive the frequency control signal Con and an output terminal Dry configured to provide a switching signal Gate to the control terminal of the primary power switch M1 based on the current sense signal Vcs and the frequency control signal Con.

In the example of FIG. 2, the coupled device comprises an opto-coupler. The input side 101-1 of the opto-coupler comprises a light emitting diode, and the output side 101-2 of the opto-coupler comprises an optical transistor. The light emitting diode has an anode and a cathode, wherein the anode is coupled to the output terminal of the isolated switching mode power supply 20 via a resistor R2 to receive the output voltage Vo, and the cathode is coupled to the coupling control terminal OP of the secondary controller 202 to receive the frequency modulation signal. The optical transistor has a first terminal coupled to the primary ground node PGNG, a control terminal configured to sense the light of the light emitting diode, and a second terminal configured to provide a frequency control signal Con based on the light of the light emitting diode. Persons of ordinary skill in the art should know that the light of the light emitting diode indicates the output voltage Vo and the frequency modulation signal. Thus the frequency modulation signal is transmitted to the optical transistor. As a result, the frequency control signal Con has similar waveform with the frequency modulation signal. Persons of ordinary skill in the art should know that the resistor R2 is configured to limit the current flowing through the light emitting diode. In some embodiments, the resistor R2 may be omitted. The light emitting diode and the resistor R2 may be coupled in other ways, for example, the light emitting diode and the resistor R2 may switch their positions. Persons of ordinary skill in the art should know that the opto-coupler and the resistor R2 are configured to convert the frequency modulation signal at the secondary side to the frequency control signal at the primary side. Any suitable circuit performing the above function may be used without detracting from the merits of the present invention. The operation of the opto-coupler is known to persons of ordinary skill in the art and is not described here for brevity.

In one embodiment, the secondary controller 202 comprises: an error amplifier 102 having a first input terminal (non-inverting input terminal) configured to receive the first feedback signal Vfb1 indicative of the output voltage Vo, a second input terminal (inverting input terminal) configured to receive a first reference signal Vref1 and an output terminal configured to provide an error signal Vc based on the first feedback signal Vfb1 and the first reference signal Vref1; an error comparator 103 having a first input terminal (inverting input terminal) coupled to the output terminal of the error amplifier 102 to receive the error signal Vc, a second input terminal (non-inverting input terminal) configured to receive a sawtooth signal Vsaw and an output terminal configured to provide a first comparison signal based on the error signal Vc and the sawtooth signal Vsaw; and a first switch M2 having a first terminal coupled to the coupling control terminal OP of the secondary controller 202, a second terminal coupled to a secondary ground node SGND and a control terminal coupled to the output terminal of the error comparator 103 to receive the first comparison signal, wherein based on the first comparison signal, the first switch M2 is turned ON and OFF to generate the frequency modulation signal at the coupling control terminal OP.

in one embodiment, the secondary controller 202 further comprises a sawtooth generator 104 coupled to the connection node of the secondary winding Ls and the secondary power switch D1 to receive a synchronous signal and to provide the sawtooth signal Vsaw. The operation of the sawtooth generator 104 is: when the secondary power switch D1 is tuned ON, the synchronous signal is logical high and the sawtooth signal Vsaw increases; when the sawtooth signal Vsaw reaches the error signal Vc, the sawtooth signal Vsaw decreases to be logical low. The sawtooth signal Vsaw increases again when the secondary power switch D1 is turned ON in the next switching cycle.

Figure 3:
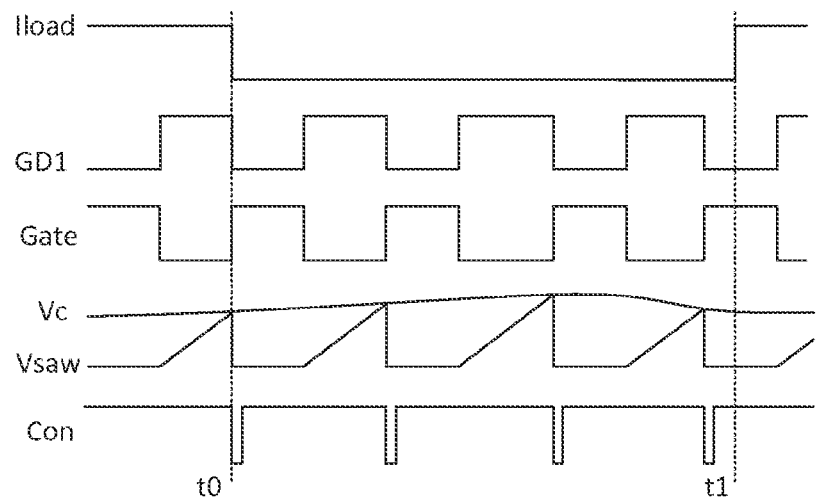
FIG. 3 shows the waveforms of the signals of the isolated switching mode power supply 20 in FIG. 2.

In one embodiment, the synchronous signal is omitted. The logical low time of the sawtooth signal Vsaw is preset to a constant time period t. That is to say, the sawtooth signal Vsaw increases after a constant time period t, and becomes logical low when it reaches the error signal Vc. And after a fixed time period t, the sawtooth signal Vsaw increases again. The operation repeats so that the sawtooth signal has a waveform as shown in FIG. 3. The constant time period t may be adjusted in difference systems.

In one embodiment, the primary controller 201 comprises: a current limit comparator 107 having a first input terminal configured to receive the current sense signal Vcs, a second input terminal configured to receive a peak current signal Vlim, and an output terminal configured to provide a current limit signal Vp based on the current sense signal Vcs and the peak current signal Vlim; and a logic circuit 108 having a first input terminal coupled to the output side 101-2 of the coupled device to receive the frequency control signal Con, a second input terminal coupled to the output terminal of the current limit comparator 107 to receive the current limit signal Vp, and an output terminal configured to provide a logic control signal 111 based on the frequency control signal Con and the current limit signal Vp.

In one embodiment, the logic control signal 111 provided by the logic circuit 108 is applied as the switching signal Gate to control the primary power switch M1.

In the example of FIG. 2, the frequency control signal Con is an active-low signal. The logic circuit 108 comprises: a first inverter 109 having an input terminal coupled to the output side 101-2 of the coupled device to receive the frequency control signal Con and an output terminal configured to provide the inverted frequency control signal; a first RS flip-flop 106 having a set terminal "S" coupled to the output terminal of the first inverter 109 to receive the inverted frequency control signal, a reset terminal "R" coupled to the output terminal of the current limit comparator 107 to receive the current limit signal Vp and an output terminal "Q" configured to provide the logic control signal 111 based on the inverted frequency control signal and the current limit signal Vp.

In some embodiments, the frequency control signal Con is an active-high signal. Thus the first inverter 109 may be omitted.

Figure 1:
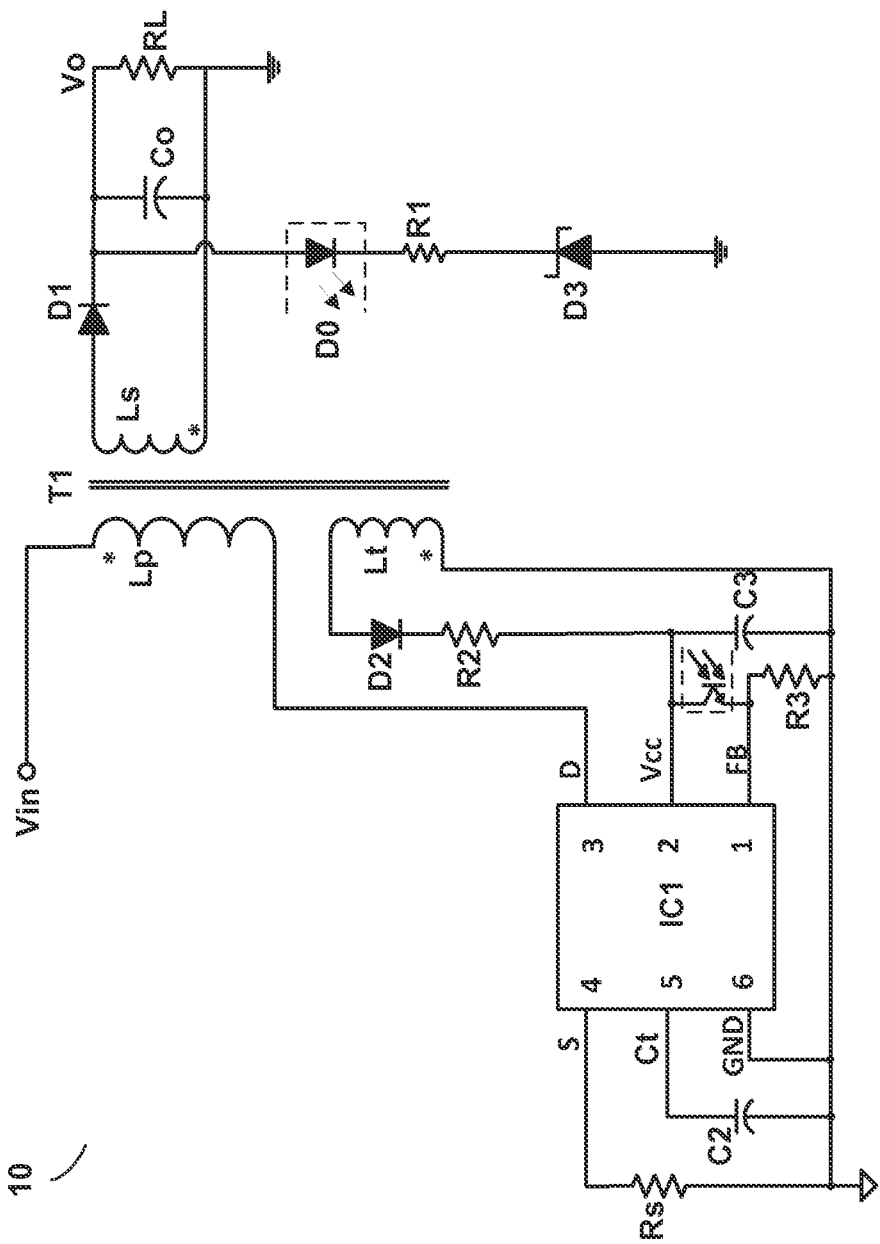
FIG. 1 schematically shows a prior art isolated switching mode power supply 10.

FIG. 3 shows the waveforms of the signals of the isolated switching mode power supply 20 in FIG. 1 and FIG. 2, wherein: Iload represents the load current, i.e., a current flowing through the load resistor RL; GD1 represents the ON and OFF of the secondary power switch D1, and wherein GD1 is high when the secondary power switch D1 is ON and is low when the secondary power switch D1 is OFF; and Gate represents the switching signal which controls the primary power switch M1. In the example of FIG. 2, the primary power switch M1 is turned ON when the switching signal Gate is logical high, and is turned OFF when the switching signal Gate is logical low.

The operation of the isolated switching mode power supply 20 will be described with reference to FIGS. 2 and 3. The output voltage Vo of the isolated switching mode power supply 20 maintains when the isolated switching mode power supply 20 works in steady state. As shown in FIG. 3, the load changes from heavy to light at time t0. Then, the output voltage increases slightly, followed by the increase of the first feedback signal Vfb1. As a result, the error signal Vc increases. Then the time period of the sawtooth signal Vsaw increasing to reach the error signal Vc is prolonged for the rising slope of the sawtooth signal Vsaw is constant. Thus, the OFF time of the first switch M2 increases. In one embodiment, the frequency control signal Con is logical high when the first switch M2 is turned OFF, and is logical low when the first switch M2 is turned ON. So the logical high time of the frequency control signal Con is prolonged when the load changes from heavy to light. The frequency control signal Con is inverted to set the first RS flip-flop 106, so as to turn ON the primary power switch M1. As a result, the OFF time of the primary power switch M1 increases. Thus, the energy transferred to the load resistor RL is reduced and the load current decreases so as to adapt to the change of the load. At time t1, the load changes from light to heavy. At this time, the output voltage decreases slightly, followed by the decrease of the first feedback signal Vfb1. As a result, the error signal Vc decreases. Based on the similar principle of when the load changes from heavy to light, the OFF time of the first switch M2 decreases. So the logical high time of the frequency control signal Con is shortened. As a result, the OFF time the primary power switch M1 decreases. Thus, the energy transferred to the load resistor RL is increased and the load current increases so as to adapt to the change of the load.

In the switching mode power supply 20, the coupled device is idle when the first switch M2 is turned OFF. Persons of ordinary skill in the art should know that the power consumption of the coupled device is almost zero when the coupled device is idle. As can be seen from the above description, the OFF time of the first switch M2 will be prolonged when the isolated switching mode power supply 20 has no load or light load. As a result, the idle time of the coupled device is prolonged too. Thus, the power consumption of the coupled device and the auxiliary circuits, i.e., the resistor R2, could be reduced and the efficiency of the power supply 20 is improved.

Figure 4:
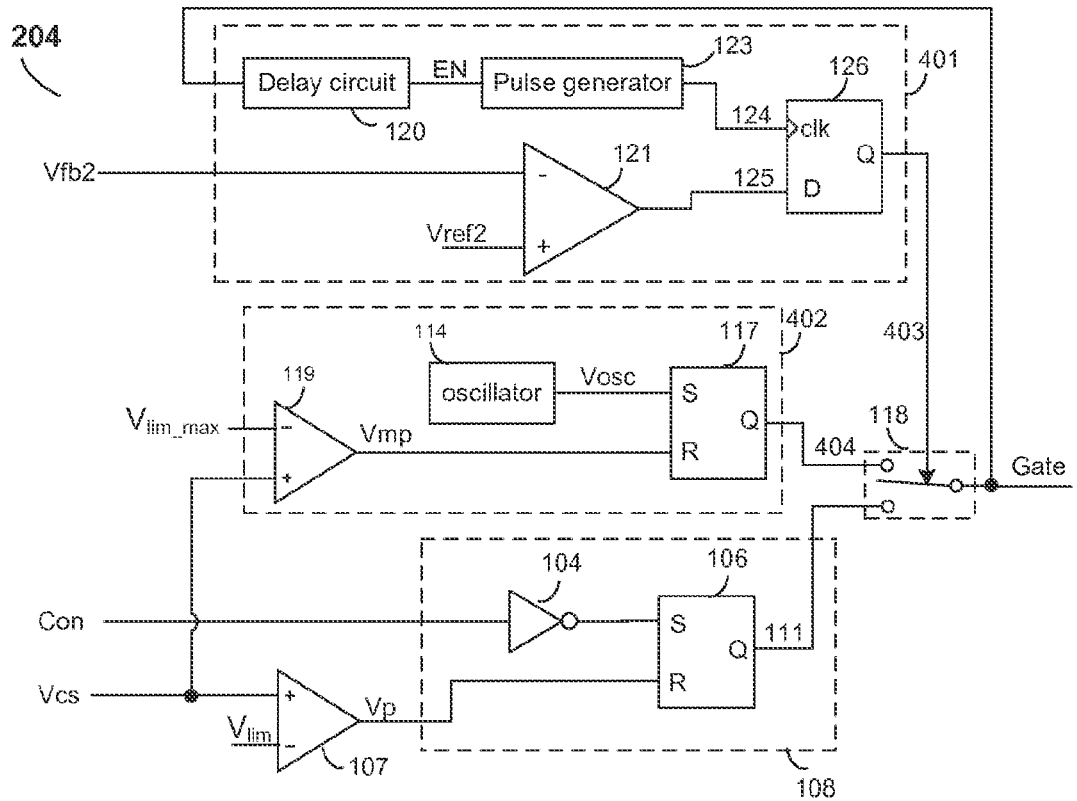
FIG. 4 schematically shows a primary controller 204 in accordance with an embodiment of the present invention.

FIG. 4 schematically shows a primary controller 204 in accordance with an embodiment of the present invention. Compared with the primary controller 201 in FIG. 2, the primary controller 204 further has a second feedback terminal FB2 coupled to the first terminal of the third winding Lt to receive a second feedback signal Vfb2. The primary controller 204 further comprises: a load detecting circuit 401 having a first input terminal configured to receive the second feedback signal Vfb2, a second input terminal configured to receive the switching signal Gate and an output terminal configured to provide a load detecting signal 403 based on the second feedback signal Vfb2 and the switching signal Gate; a startup control circuit 402 having an input terminal configured to receive the current sense signal Vcs and an output terminal configured to provide a startup control signal 404 based on the current sense signal Vcs.

As can be seen from FIG. 2, the output voltage Vo is supplied to the power terminal Vcc as the power supply of the secondary controller 202. Thus the frequency control signal Con and the frequency modulation signal may be wrong during startup or during when the output voltage Vo is too low. In that situation, the frequency control signal Con is blocked and the startup control circuit 402 instead of the logic circuit 108 controls the primary power switch M1.

In one embodiment, the primary controller 204 further comprises a selector 118 having a first input terminal coupled to the output terminal of the startup control circuit 402 to receive the startup control signal 404, a second input terminal coupled to the output terminal "Q" of the first RS flip-flop 106 to receive the logic control signal 111, a control terminal coupled to the output terminal of the load detecting circuit 401 to receive the load detecting signal 403 and an output terminal configured to provide the startup control signal 404 or logic control signal 111 based on the load detecting signal 403.

In one embodiment, the selector 118 comprises a SPDT (Signal-Pole Double-Throw) switch, wherein the SPDT switch has a first input terminal configured to receive the startup control signal 404, a second input terminal configured to receive the logic control signal 111, a control terminal configured to receive the load detecting signal 403 and an output terminal configured to provide the startup control signal 404 or the logic control signal 111 base on the load detecting signal 403.

In one embodiment, the load detecting circuit 401 comprises: a load detecting comparator 121 having a first input terminal (inverting input terminal) configured to receive the second feedback signal Vfb2, a second input terminal (non-inverting input terminal) configured to receive a second reference signal Vref2 and an output terminal configured to provide a load comparison signal 125 based on the second feedback signal Vfb2 and the second reference signal Vref2; a pulse generator 123 having an input terminal configured to receive the switching signal Gate and an output terminal configured to generate a pulse signal 124 based on the switching signal Gate; and a latch 126 having a clock terminal coupled to the output terminal of the pulse generator 123 to receive the pulse signal 124, an input terminal coupled to the output terminal of the load detecting comparator 121 to receive the load comparison signal 125 and an output terminal configured to provide the load detecting signal 403 based on the pulse signal 124 and the load comparison signal 125.

In one embodiment, the load detecting circuit 401 further comprises a delay circuit 120 having an input terminal configured to receive the switching signal Gate and an output terminal configured to generate an enable signal EN to the output terminal of the pulse generator 123, wherein the delay circuit 120 delays the switching signal Gate so that the pulse generator 123 generates the pulse signal 124 some times later after the primary power switch M1 is turned OFF. The second feedback signal Vfb2 indicates the voltage across the third winding Lt which is proportional to the output voltage Vo when the secondary power switch D1 is ON. So the second feedback signal Vfb2 is proportional to the output voltage Vo when the secondary power switch D1 is ON. In one embodiment, when the output voltage Vo is too low that the secondary controller 202 could not operate properly, the second feedback signal Vfb2 is lower than the second reference signal Vref2, and the load detecting comparator 121 flips. The load comparison signal 125 generated by the load detecting comparator 121 is latched by the latch 126 at the pulse generated by the pulse generator 123. Meanwhile, the latch 126 generates the load detecting signal 403 to indicate if the output voltage Vo is too low. The selector 118 is controlled by the load detecting signal 403. When the load detecting signal 403 indicates that the output voltage Vo is lower than the required value which could not be able to ensure the proper work of the secondary controller 202, the startup control signal 404 is selected to be the switching signal Gate to control the primary power switch M1. Otherwise, the logic control signal 111 is selected to be the switching signal Gate. The delay circuit 120 is configured to filter the glitch of the second feedback signal Vfb2 when the secondary power switch D1 is turned ON. Persons of ordinary skill in the art should know that the value of the second reference signal Vref2 and the delay time of the delay circuit 120 may be different in different systems.

In one embodiment, the startup control circuit 402 comprises: a max-peak current comparator 119 having a first input terminal configured to receive the current sense signal Vcs, a second input terminal configured to receive a max-peak current signal Vlim_max, and an output terminal configured to provide a max-peak current limit signal Vmp based on the current sense signal Vcs and the max-peak current signal Vlim_max; an oscillator 114 configured to provide a clock signal Vosc; and a second RS flip-flop 117 having a set terminal "S" coupled to the oscillator 114 to receive the clock signal Vosc, a reset terminal "R" coupled to the output terminal of the max-peak current comparator 119 to receive the max-peak current limit signal Vmp and an output terminal "Q" configured to provide the startup control signal 404 based on the clock signal Vosc and the max-peak current limit signal Vmp.

In one embodiment, the clock signal Vosc generated by the oscillator 114 has a constant frequency fs_max, which is also the maximum frequency of the isolated switching mode power supply 20.

Figure 5:
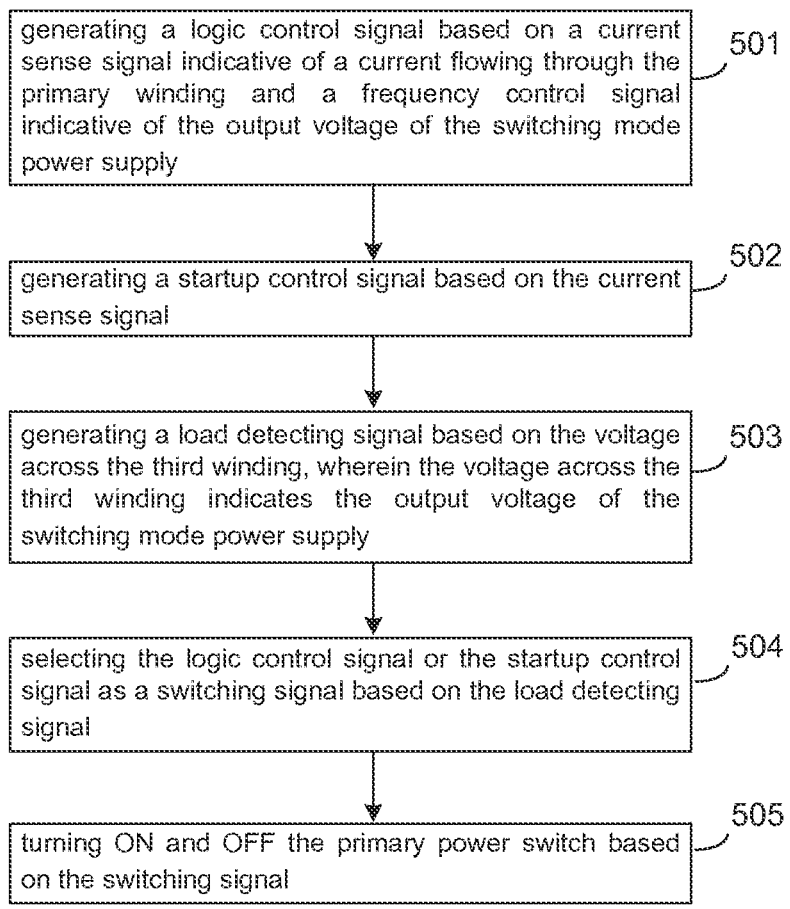
FIG. 5 shows a flow chart 50 of a method of controlling an isolated switching mode power supply in accordance with an embodiment of the present invention.

FIG. 5 shows a flow chart 50 of a method of controlling an isolated switching mode power supply in accordance with an embodiment of the present invention. The isolated switching mode power supply comprises a transformer, a primary power switch and a secondary power switch, wherein the transformer has a primary winding, a secondary winding and a third winding, and wherein the primary power switch is coupled to the primary winding and the secondary power switch is coupled to the secondary winding. The method comprises: step 501, generating a logical control signal based on a current sense signal indicative of a current flowing through the primary winding and a frequency control signal indicative of the output voltage of the switching mode power supply; step 502, generating a startup control signal based on the current sense signal; step 503, generating a load detecting signal based on the voltage across the third winding, wherein the voltage across the third winding indicates the output voltage of the switching mode power supply; step 504, selecting the logic control signal or the startup control signal as a switching signal based on the load detecting signal; and step 505, turning ON and OFF the primary power switch based on the switching signal.

In one embodiment, the step 501 comprises: comparing the current flowing through the primary winding with a peak current signal to generate a current limit signal; and setting a first RS flip-flop with the current limit signal and resetting the first RS flip-flop with the frequency control signal to generate the logic control signal.

In one embodiment, the step 502 comprises: comparing the current sense signal with a max-peak current signal to generate a max-current limit signal; generating a clock signal with fixed frequency; and setting a second RS flip-flop with the max-current limit signal and resetting the second RS flip-flop with the clock signal to generate the startup control signal.

In one embodiment, the step 503 comprises: detecting the voltage across the third winding to generate a feedback signal indicative of the output voltage of the switching mode power supply; and comparing the feedback signal with a preset reference to generate a load detecting signal.

An effective technique for controlling an isolated switching mode power supply has been disclosed. While specific embodiments of the present invention have been provided, it is to be understood that these embodiments are for illustration purposes and not limiting. Many additional embodiments will be apparent to persons of ordinary skill in the art reading this invention.

We claim:

1. An isolated switching mode power supply, comprising:
    a transformer having a primary winding, a secondary winding and a third winding, the primary winding being configured to receive an input signal, the secondary winding being configured to provide an output voltage, the third winding being configured to generate a second feedback signal indicative of the output voltage;
    a primary power switch coupled between the primary winding and a primary ground node, the primary power switch having a control terminal configured to receive a switching signal;
    a current limit comparator having a first input terminal configured to receive a current sense signal indicative of a current flowing through the primary winding, a second input terminal configured to receive a peak current signal, and an output terminal configured to provide a current limit signal based on the current sense signal and the peak current signal;
    a logic circuit having a first input terminal configured to receive a frequency control signal indicative of the output voltage, a second input terminal coupled to the output terminal of the current limit comparator to receive the current limit signal, and an output terminal configured to provide a logic control signal based on the frequency control signal and the current limit signal;

a startup control circuit having an input terminal configured to receive the current sense signal and an output terminal configured to generate a startup control signal based on the current sense signal;

a load detecting circuit having a first input terminal coupled to the third winding to receive the second feedback signal, a second input terminal configured to receive the switching signal, a third input terminal configured to receive a second reference signal, and an output signal configured to provide a load detecting signal based on the second feedback signal, the second reference signal and the switching signal; and a selector having a first input terminal coupled to the output terminal of the startup control circuit to receive the startup control signal, a second input terminal coupled to the output terminal of the logic circuit to receive the logic control signal, a control terminal coupled to the output terminal of the load detecting circuit to receive the load detecting signal, and an output terminal configured to provide the logic control signal or the startup control signal based on the load detecting signal.

2. The isolated switching mode power supply of claim 1, further comprising:

a secondary controller having a power terminal configured to receive the output voltage, a first feedback terminal configured to receive a first feedback signal indicative of the output voltage and a coupling control terminal configured to generate a frequency modulation signal based on the output voltage and the first feedback signal; and a coupled device having an input side configured to receive the output voltage and the frequency modulation signal, and an output side configured to provide the frequency control signal based on the output voltage and the frequency modulation signal.

3. The isolated switching mode power supply of claim 2, wherein the secondary controller comprises:

an error amplifier having a first input terminal configured to receive the first feedback signal, a second input terminal configured to receive a first reference signal, and an output terminal configured to provide an error signal based on the first feedback signal and the first reference signal;

an error comparator having a first input terminal coupled to the output terminal of the error amplifier to receive the error signal, a second input terminal configured to receive a sawtooth signal and an output terminal configured to provide a first comparison signal based on the error signal and the sawtooth signal; and a first switch having a first terminal coupled to the coupling control terminal of the secondary controller, a second terminal connected to a secondary ground node and a control terminal coupled to the output terminal of the error comparator to receive the first comparison signal, wherein based on the first comparison signal, the first switch is turned ON and OFF to generate the frequency modulation signal at the coupling control terminal.

4. The isolated switching mode power supply of claim 1, wherein the logic circuit comprises a first RS flip-flop having a set terminal configured to receive the frequency control signal, a reset terminal coupled to the output terminal of the current limit comparator to receive the current limit signal and an output terminal configured to provide the logic control signal based on the frequency control signal and the current limit signal.

5. The isolated switching mode power supply of claim 1, wherein the load detecting circuit comprises:

a load detecting comparator having a first input terminal configured to receive the second feedback signal, a second input terminal configured to receive the second reference signal and an output terminal configured to provide a load comparison signal based on the second feedback signal and the second reference signal;

a pulse generator having an input terminal configured to receive the switching signal and an output terminal configured to generate a pulse signal based on the switching signal; and a latch having a clock terminal coupled to the output terminal of the pulse generator to receive the pulse signal, an input terminal coupled to the output terminal of the load detecting comparator to receive the load comparison signal, and an output terminal configured to provide the load detecting signal based on the pulse signal and the load comparison signal.

6. The isolated switching mode power supply of claim 1, wherein the startup control circuit comprises:

a max-peak current comparator having a first input terminal configured to receive the current sense signal, a second input terminal configured to receive a max-peak current signal, and an output terminal configured to provide a max-peak current limit signal based on the current sense signal and the max-peak current signal;

an oscillator configured to provide a clock signal; and a second RS flip-flop having a set terminal coupled to the oscillator to receive the clock signal, a reset terminal coupled to the output terminal of the max-peak current comparator to receive the max-peak current limit signal and an output terminal configured to provide the startup control signal based on the clock signal and the max-peak current limit signal.

7. A method of controlling an isolated switching mode power supply, wherein the isolated switching mode power supply comprises a transformer, a primary power switch and a secondary power switch, wherein the transformer has a primary winding, a secondary winding and a third winding, and wherein the primary power switch is coupled to the primary winding and the secondary power switch is coupled to the secondary winding, the method comprising:

generating a logical control signal based on a current sense signal indicative of a current flowing through the primary winding and a frequency control signal indicative of the output voltage of the switching mode power supply;

generating a startup control signal based on the current sense signal;

generating a load detecting signal based on the voltage across the third winding, wherein the voltage across the third winding indicates the output voltage of the switching mode power supply;

selecting the logic control signal or the startup control signal as a switching signal based on the load detecting signal; and turning ON and OFF the primary power switch based on the switching signal.

8. The method of claim 7, wherein generating a logical control signal based on a current sense signal indicative of a current flowing through the primary winding and a frequency control signal indicative of the output voltage of the switching mode power supply comprises:

comparing the current flowing through the primary winding with a peak current signal to generate a current limit signal; and setting a first RS flip-flop with the current limit signal and resetting the first RS flip-flop with the frequency control signal to generate the logic control signal.

9. The method of claim 7, wherein generating a startup control signal based on the current sense signal comprises:
comparing the current sense signal with a max-peak current signal to generate a max-current limit signal;
generating a dock signal with fixed frequency; and
setting a second RS flip-flop with the max-current limit signal and resetting the second RS flip-flop with the dock signal to generate the startup control signal.

10. The method of claim 7, wherein generating a load detecting signal based on the voltage across the third winding, wherein the voltage across the third winding indicates the output voltage of the switching mode power supply comprises:
detecting the voltage across the third winding to generate a feedback signal indicative of the output voltage of the switching mode power supply; and
comparing the feedback signal with a preset reference to generate a load detecting signal.

* * * * *